Dec. 8, 1964     A. S. FITZ GERALD     3,160,867
VOLTAGE COMPARATOR
Filed Feb. 21, 1962     2 Sheets-Sheet 2

INVENTOR.
ALAN S. FITZGERALD
BY
Lippincott, Ralk & Hendricson
ATTORNEYS

United States Patent Office 3,160,867
Patented Dec. 8, 1964

3,160,867
VOLTAGE COMPARATOR
Alan S. FitzGerald, 333 Corte Madera Ave.,
Mill Valley, Calif.
Filed Feb. 21, 1962, Ser. No. 174,820
7 Claims. (Cl. 340—248)

This invention relates to a quality control circuit and, more particularly, to a test circuit operative to indicate by a positive signal device whether or not a particular parameter which has been translated into an electrical signal falls within predetermined tolerance limits of an established standard therefor.

There is a wide need in industry for a device that will facilitate the maintenance of close control over the quality of production items. In many instances quality control methods are practiced by manual operation of measuring instruments and devices, a slow tedious process. To the extent that production quality is presently controlled or indicated by mechanical or electrical devices, such devices are usually of such complexity that the constant attention and frequent service of highly trained personnel is required. Even where some product parameters indicative of quality, such as weight or dimension, can be indicated by calibrated scales and/or meters which may be interpreted by relatively unskilled operators, the necessity that such scales or meters be continuously and studiously observed, often precipitates mental fatigue and eyestrain to the extent that frequent rotation and relief of testing personnel is necessary. Further, where precise manufacturing tolerances are demanded, it is extremely difficult to secure an accurate indication which is itself maintained within close limits without the use of extremely sensitive electrical measuring instruments for the purpose of visual grading. In the case of automatic sorting, it is usually necessary to resort to very delicate relays.

It is, therefore, an object of this invention to provide a quality control test circuit capable of producing a positive and clear indication that a parameter falls within necessary tolerances.

It is a further object of this invention to provide a quality control circuit that provides a continuous check on a particular parameter without requiring measurement or interpretation of measuring indicators.

It is a further object of this invention to provide a test circuit having no contacts or moving elements which is capable of giving a positive indication of acceptable quality.

The circuit of this invention is responsive to an electrical signal indicative of the value of a particular parameter, which signal might be generated by a suitable transducer which translates the value of a physical or chemical property into an electrical signal. For example, the ability of a product to transmit light or sound might be indicated by a light or sound sensitive transducer. In any event, the circuit compares the voltage of such a test or sample signal algebraically against a standard voltage representative of the ideal value for the particular characteristic being tested, with the differential signal being transmitted to each of two magnetic amplifiers. The two signals so transmitted are first modified by adding a negative current increment to one and a positive increment to the other to differentiate them as an indication of manufacturing tolerance variations from the ideal characteristic value. The magnetic amplifiers are of the type which is responsive to polarity changes. Therefore, since the two signals are so modified each of the two amplifiers will respond at a different value of the test or sample signal. The outputs of the two amplifiers are delivered to two opposing control windings of a neutral magnetic amplifier which is responsive only to signal strength, independent of polarity. Within the range of differential output of the polarity responsive amplifiers established by the amount of signal modification, the output current of the neutral amplifier is sufficient to energize a suitable signal device, thus indicating that the quality characteristic of the test product is of an acceptable value.

Other objects and advantages of this invention will become apparent from the specification following when read in connection with the accompanying drawings wherein.

Figure 1:
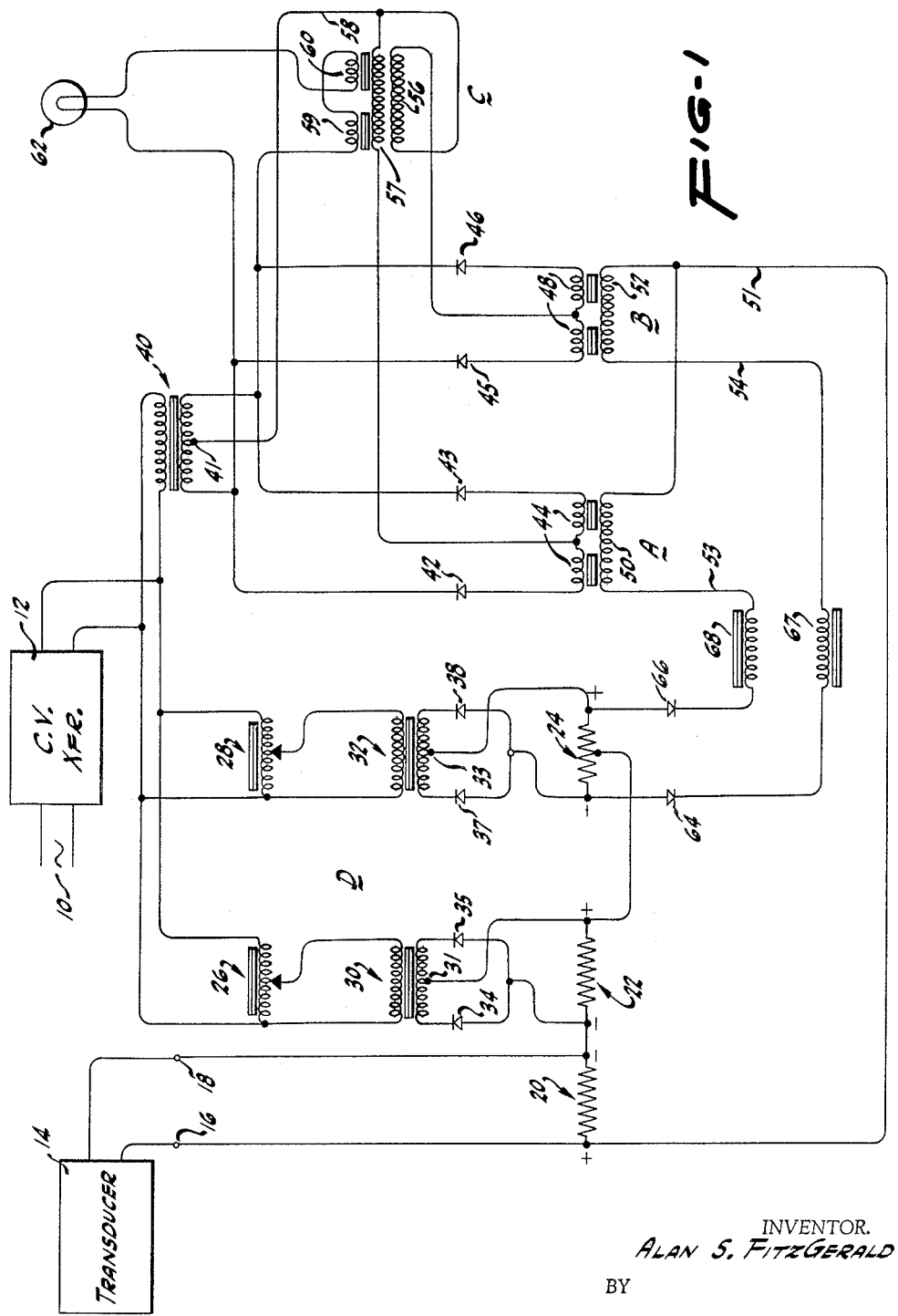
FIG. 1 is a diagram of a circuit capable of testing and indicating quality control in accordance with the preferred embodiment of this invention.
Figure 2:
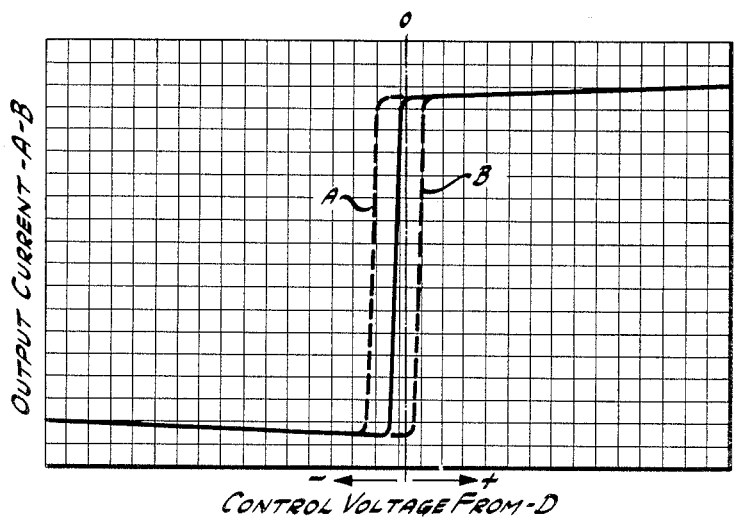
FIG. 2 is a magnetic amplifier transfer curve illustrating the operation of components of the circuit of FIG. 2.

Referring now to the drawings in detail, the basic components of the circuit include a pair of magnetic amplifiers A and B which are of similar construction, both being of the conventional self-saturating type which respond in accordance with the polarity of the D.C. controlling signal. The curve shown in full lines in FIG. 2 represents a typical transfer curve of such a magnetic amplifier in that it reflects the sharp increase in output current as the polarity of the control voltage changes from negative to positive. The circuit also includes a third magnetic amplifier C of the neutral type, i.e. its response is not dependent upon the polarity of the D.C. control signal, but solely upon signal strength. The neutral amplifier C is controlled by an m.m.f. which is representative of the difference between the outputs of amplifier circuits A and B as will hereinafter be described. Also included in the diagram of FIG. 1 is a sensing network D from which is derived differential signals which control the magnetic amplifiers A, B and C, such differential signals being generated in accordance with the comparison of the voltage of an electrical signal representative of the actual value of the parameter measured against a standard voltage signal representative of the ideal value for such parameter.

The quality control system of this invention is energized with a standard alternating current supplied from source 10 and, because the limits of deviation to which the quality control circuit is responsive are so close, a constant voltage regulating device is preferably included at 12.

A direct current test or specimen signal, representative of a parameter of an object being inspected, is generated at an appropriate transducer 14 introduced into the system at binding posts 16 and 18 which are connected to the positive and negative terminals, respectively, of a resistor 20. By application of appropriate transducers, such a signal may be generated so as to be representative of weight, size, ability of an object to transmit light or sound, or any of numerous characteristics that desirably are maintained within predetermined limits during manufacture. For example, the systems of this invention might be employed for controlling the quality of production line transformers, in which case the measurement of magnetizing current would be indicative of production quality. Consequently, the alternating magnetizing current may be rectified to produce a D.C. current corresponding thereto which may be applied to the binding posts 16 and 18 and, hence, across the resistor 20. The resultant voltage drop across the resistor 20 may be designated the "sample" or "specimen" voltage.

Connected in series with the resistor 20 are two additional resistors 22 and 24 which are energized from the constant voltage supply at 12. The resistors are connected so that the specimen signal voltage across resistor 20 is compared with a pre-set standard voltage across resistor 22 within tolerance limits governed by resistor 24. The constant voltage source 12 supplies a pair of manually adjustable auto-transformers 26 and 28, each of which in turn supplies the primary coil of one of a pair of transformers 30 and 32, respectively. Both extremities of the secondary coil of one transformer 30 are connected through rectifiers 34 and 35 to the negative side of resistor 22, with a mid-point tap 31 from the secondary coil of transformer 30 being connected to the positive side of the resistor 22. The polarity of the connections to resistor 22 are such that the resultant D.C. voltage therein is in opposition to that of resistor 20, i.e. the negative side of resistor 20 is connected to the negative side of resistor 22. Therefore, the direction of current flow through the resistors 20 and 22 depends upon an algebraic comparison of their respective voltages.

In similar fashion, the secondary coil of the other transformer 32 which is energized from auto transformer 28 is connected at both ends through rectifiers 37 and 38 to the negative end of the resistor 24 with the positive side of resistor 24 being connected to a mid-point tap 33 from the secondary. Thus, there will appear across the resistor 22 a D.C. voltage which may be controlled manually to any value up to a predetermined maximum by operation of the adjustable auto transformer 26 and there is a D.C. voltage across the resistor 24 which is adjusted by auto transformer 28. The voltage across the resistor 22 may be referred to as the "standard" or "reference" voltage, and the voltage across resistor 24 may be termed the "tolerance" voltage.

Also energized from the constant standard voltage source 10, 12 is a transformer 40 the opposite ends of which are connected across magnetic amplifiers A and B. Specifically, the opposite ends of the secondary coil of transformer 40 are connected through rectifiers 42 and 43 to the gate windings 44 of magnetic amplifier A, and through rectifiers 45 and 46 to the gate windings 48 of magnetic amplifier B. The control windings 50 and 52 of both magnetic amplifiers A and B are connected at one end by conductor 51 to the positive terminal of resistor 20. Each of the control windings 50 and 52 is connected at its other end to one of the extremities of the resistor 24 by means of conductors 53 and 54, respectively. The magnetic amplifiers A and B should be of the same type and design and preferably as well matched as possible. Though both are supplied from the same transformer 40, each may act independently in accordance with the control currents furnished to the control windings 50 and 52. The output of the magnetic amplifier A is withdrawn from the junction between the gate windings 44 and the output from amplifier B is withdrawn from the junction between its gate windings 48, each of these outputs being fed to one end of one of two opposed control windings 56 and 57 of the neutral magnetic amplifier C. The other ends of both control windings are connected by conductor 58 to the mid-tap 41 on the secondary winding of transformer 40. The gate windings 59 and 60 of the neutral amplifier C are connected in series, decoupled, and together with the signal lamp 62 are connected in series to be energized from the extremities of the secondary coil of the transformer 40.

In operation, if the auto transformer 28 controlling the tolerance voltage were turned down to zero, so that the transformer 32 and rectifiers 37 and 38 do not cause any current to flow into the resistor 24, that particular resistor would have no effect upon the operation of the system other than a negligible resistive signal attenuation applied symmetrically to both amplifier control coils 50 and 52. Preferably, the connections between the sensing network D and the magnetic amplifiers A and B are arranged so that when the specimen voltage across the resistor 20 is less than the reference voltage across the resistor 22, a positive signal is delivered to the control windings 50 and 52 of both amplifiers A and B, and if the specimen voltage exceeds the reference voltage a negative signal will be applied to both magnetic amplifiers. Since the magnetic amplifiers A and B are substantially a matching pair, both will deliver identical outputs represented by the full line in FIG. 2, as long as no current flows through resistor 24. As soon as the sample voltage exceeds the reference voltage by even a small margin, i.e. when the signal becomes slightly negative, the output of both magnetic amplifiers A and B will simultaneously be reduced to a very low value. Conversely, should the sample or specimen voltage be reduced below the value of the reference voltage, the polarity of the differential signal will be reversed to positive and the outputs of magnetic transformers A and B will increase sharply.

As previously described, the outputs of the magnetic amplifiers A and B are applied in opposition to the control windings 54 and 56 of the neutral magnetic amplifier C and since the outputs are identical with no current flowing through resistor 24, they are, in effect, cancelled out in the opposed control windings. In that case, the output of the neutral magnetic amplifier C is insufficient to illuminate the lamp 62.

Figure 3:
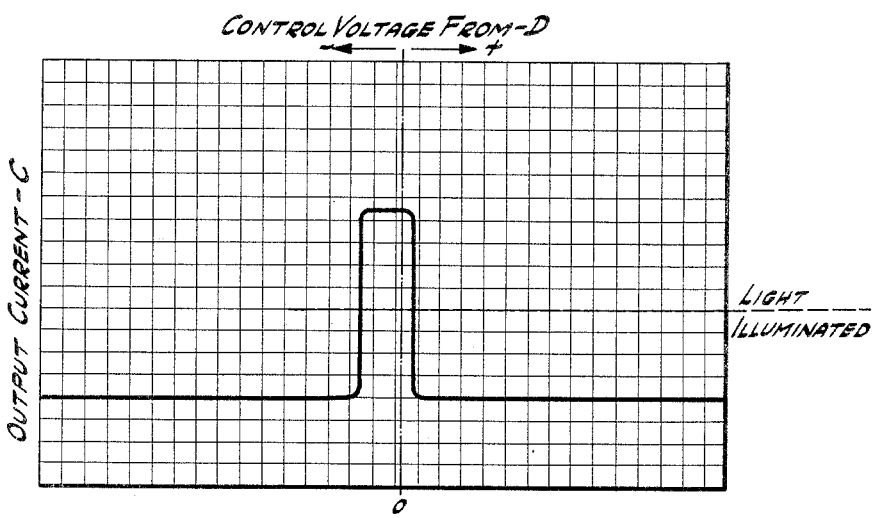
FIG. 3 is a graph further depicting the range of quality control indication produced by the circuit of FIG. 1.

If, on the other hand, the auto transformer 28 of the sensing network D were turned up a small amount so that rectified current is caused to flow in the mid-tap tolerance resistor 24, the resultant D.C. voltage drop across resistor 24 will cause a positive increment of current to be added to that supplied from the positive terminal through conductor 53 to amplifier A, and increment current is supplied from the negative terminal through conductor 54, to decrease the current supplied to amplifier B. This algebraic addition to the current supplied to the control winding of transformer A and subtraction from that supplied to the control winding of transformer B will produce a concomitant differential in the output of the magnetic amplifiers A and B as indicated by the broken lines A' and B' in FIG. 2. Accordingly, the magnetomotive force applied to the opposed control windings 54 and 56 of the neutral magnetic amplifier will not be algebraically equal, but the differential output signals will apply saturating ampere-turns to the cores 57 and 58 in accordance with the differential control voltage represented by the spread between the two broken lines of FIG. 2. Referring to FIG. 3, it will be seen that through the range of differential output current from magnetic amplifiers A and B, and only during this range, the output current from the neutral magnetic amplifier will be sufficient to illuminate the lamp 62.

Thus, the setting of auto transformer 26 establishes the reference voltage setting representative of an ideal value for the parameter being measured, and the setting of auto transformer 28 establishes the percentage deviation from that ideal setting representative of acceptable values for the parameter. That is, the amount of positive and negative increment imposed will advance and retard the polarity change of the respective differential signals to which the two magnetic amplifiers A and B are responsive.

I show also in FIG. 1 Zener diodes 64 and 66 together with filter chokes 67 and 68 in the leads connecting the resistor 24 with the control windings 50 and 52, respectively. Without these elements the circuit is completely effective for inspection limits representative of most manufacturing processes. However, where extremely close tolerances are required, the performance of this quality control system is improved materially by the additional cut-off effect of the zener diodes and the minimization of irrelevant parasitic ripple effects between chokes. In like manner, it is advantageous to provide conventional filtering means for supplying the resistors 22 and 24 from the diodes 34–38.

Although a preferred embodiment of this invention has been disclosed and described herein, it is to be understood that changes, modifications and variations therein may be made by those skilled in the art without departing from the spirit and scope of my invention which is defined by the claims appended hereto.

Having described my invention, I claim:

1. Apparatus for comparing the value of a test signal against a standard comprising
    first and second resistors,
    a first circuit conducting a direct current proportionate to a test signal through said first resistor,
    a second circuit conducting a fixed standard direct current through said second resistor,
    means connecting said first and second resistors in series opposed relationship,
    first and second polarity sensitive means for delivering output signals which vary sharply in response to change in polarity of input voltages applied thereto,
    said first and second polarity sensitive means having substantially matched input voltage vs. output signal transfer characteristics,
    means connecting said first and second resistors to the inputs of said first and second polarity sensitive means to apply input voltages thereto proportionate to the algebraic difference between the test signal current and standard current,
    means delivering a negative direct current voltage increment to the input of one of said polarity sensitive means and a positive direct current voltage increment to the input of the other of said polarity sensitive means to thereby shift the transfer characteristics of said polarity sensitive means relative to each other, and
    an electro-responsive device conditioned to be energized in response to a differential signal output from said first and second polarity sensitive means, whereby said electro-responsive device is energized only when the algebraic difference input voltages applied to said polarity sensitive means are within a range defined by said negative and positive voltage increments.

2. The apparatus defined in claim 1 wherein said electro-responsive device includes
    a signal amplifier device responsive to control current independent of polarity,
    a pair of control elements on said signal amplifier in series opposed,
    each of said control members being connected to the output of one of said first and second magnetic amplifiers, and
    a signal device connected to the output of said signal amplifier device.

3. Apparatus for comparing the value of a test signal against a standard comprising
    first circuit means applying a direct current voltage representative of a test signal to a resistor,
    second circuit means applying a direct current voltage representative of a fixed standard to said resistor in opposition to the test signal voltage,
    said first and second circuit means thereby producing a resultant voltage across said resistor proportionate to the algebraic difference between said test signal and fixed standard,
    first and second matched self-saturating magnetic amplifiers for delivering output signals which vary sharply in response to change in polarity of voltages applied to the control inputs thereof,
    differential signal conductors coupling said control inputs of said magnetic amplifier in parallel across the extremities of said resistor in receiving relationship to said resultant voltage,
    third circuit means delivering a negaitve direct current voltage increment to the control input of one of said amplifiers and a positive direct current increment to the control input of the other of said amplifiers, and
    electro-responsive means coupled to the outputs of said magnetic amplifiers and conditioned to be energized in response to a differential between the output signals therefrom.

4. The apparatus defined in claim 3 wherein said electro-responsive means includes
    a neutral magnetic amplifier responsive to control current signals independent of polarity,
    a pair of control windings on said neutral amplifier in series opposed,
    each of said control windings being connected to the output of one of said first and second magnetic amplifiers, and
    a signal device connected to the output of said neutral magnetic amplifier.

5. Apparatus for comparing the value of a test signal against a standard comprising
    means for producing a differential voltage proportionate to the algebraic difference between a test signal and a standard signal,
    means increasing said differential voltage by a predetermined positive direct current voltage increment to produce a first control voltage,
    means decreasing said differential voltage by a predetermined negative direct current voltage increment to produce a second control voltage,
    a pair of matched self-saturating magnetic amplifiers for delivering output signals which vary sharply in response to change in polarity of voltages applied to the control inputs thereof,
    means applying said first control voltage to the control input of one of said magnetic amplifiers,
    means applying said second control voltage to the control input of the other of said magnetic amplifiers, and
    means coupled to the outputs of said magnetic amplifiers for detecting differences between said output signals therefrom as an indication of differences between said test signal and standard signal within tolerances defined by said positive and negative voltage increments.

6. Apparatus for comparing the value of a test signal against a standard comprising
    first and second resistances,
    means applying a direct current voltage representative of a test signal across said first resistance,
    means applying a direct current voltage representative of a fixed standard signal across said second resistance,
    means connecting said first and second resistances in series opposed relationship,
    a third resistance having an intermediate tap,
    means applying a direct current voltage of adjustable magnitude across said third resistance,
    a pair of matched self-saturating magnetic amplifiers for delivering output signals which vary sharply in response to change in polarity of voltages applied to the control windings thereof,
    means coupling one end of the series combination of said first and second resistances to first ends of the control windings of said magnetic amplifiers,
    means coupling the other end of said series combination of said first and second resistances to the tap of said third resistance,
    means coupling one end of said third resistance to the second end of the control winding of one of said magnetic amplifiers,
    means coupling the other end of said third resistance to the second end of the control winding of the second of said magnetic amplifiers, and
    electro-responsive means coupled to the outputs of said magnetic amplifiers for indicating differences between the output signals therefrom.

7. Apparatus for comparing the value of a test signal against a standard according to claim 6, wherein said electro-responsive means includes a neutral magnetic amplifier responsive to a control current signal independent of polarity, said neutral magnetic amplifier including a pair of control windings connected in series opposed relationship, each of said control windings being connected to the output of one of said pair of self-saturating magnetic amplifiers, and a signal device connected to the output of said neutral magnetic amplifier.

References Cited by the Examiner
UNITED STATES PATENTS

| | | | |
|---|---|---|---|
| 2,505,072 | 4/50 | Sunstein | 324—57 |
| 2,618,674 | 11/52 | Stanton | 324—98 |
| 2,745,090 | 5/56 | Grillo | 340—213 X |
| 2,759,150 | 8/56 | Rosenbaum | 324—98 |
| 2,896,091 | 7/59 | Nuttall et al. | 307—88 |
| 3,018,417 | 1/62 | Colaiaco et al. | 340—248 X |

NEIL C. READ, *Primary Examiner.*